United States Patent
Kiely et al.

(10) Patent No.: US 8,242,369 B2
(45) Date of Patent: *Aug. 14, 2012

(54) ELECTRICAL CONNECTOR

(75) Inventors: Kenneth M. Kiely, Milford, CT (US); Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/583,900

(22) Filed: Aug. 26, 2009

(65) Prior Publication Data

US 2010/0071954 A1   Mar. 25, 2010

Related U.S. Application Data

(63) Continuation-in-part of application No. 12/214,955, filed on Jun. 24, 2008, now Pat. No. 7,582,831, which is a continuation-in-part of application No. 11/713,264, filed on Mar. 2, 2007, now Pat. No. 7,402,752.

(51) Int. Cl.
 *H01R 4/00* (2006.01)

(52) U.S. Cl. .................................. 174/84 R; 174/88 R
(58) Field of Classification Search ............... 174/65 G, 174/68.1, 68.3, 72 C, 69, 71 R; 439/92, 587, 439/320, 557, 535, 567, 142
See application file for complete search history.

(56) References Cited

U.S. PATENT DOCUMENTS

| 6,355,884 B1 * | 3/2002 | Gretz | 174/659 |
| 7,075,007 B2 * | 7/2006 | Auray et al. | 174/668 |

* cited by examiner

*Primary Examiner* — William Mayo, III
(74) *Attorney, Agent, or Firm* — Ware, Fressola, Van Der Sluys & Adolphson LLP

(57) ABSTRACT

By enabling two separate and independent solid or rigid tubing or conduits to be quickly and easily secured to a single connector for being mounted directly to a single elongated rigid or solid electrical tubing/conduit, an efficient, easily manufactured and easily assembled multiple conduit connector is realized. A multiple conduit connector is constructed for receiving two separate and independent rigid tubings or conduits and enables the two conduits/tubes to be securely affixed to one end of the connector while a single rigid metal tubing or conduit is secured to the opposed end.

14 Claims, 11 Drawing Sheets

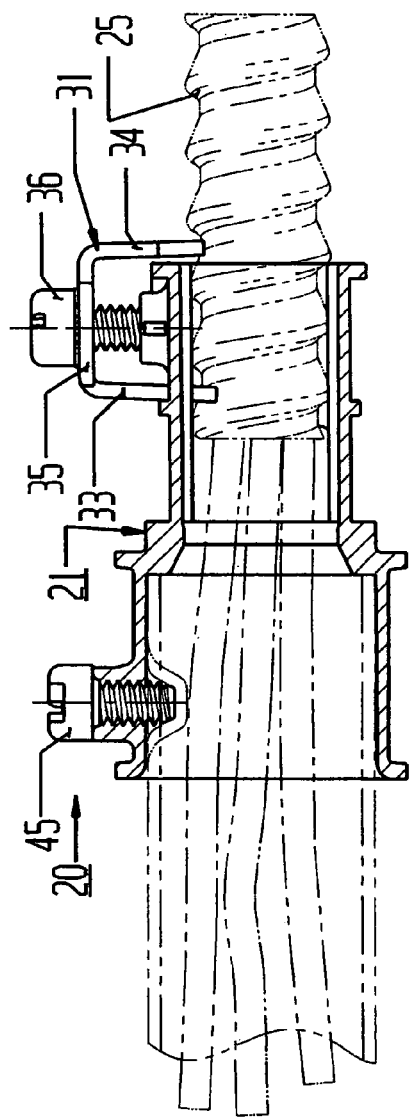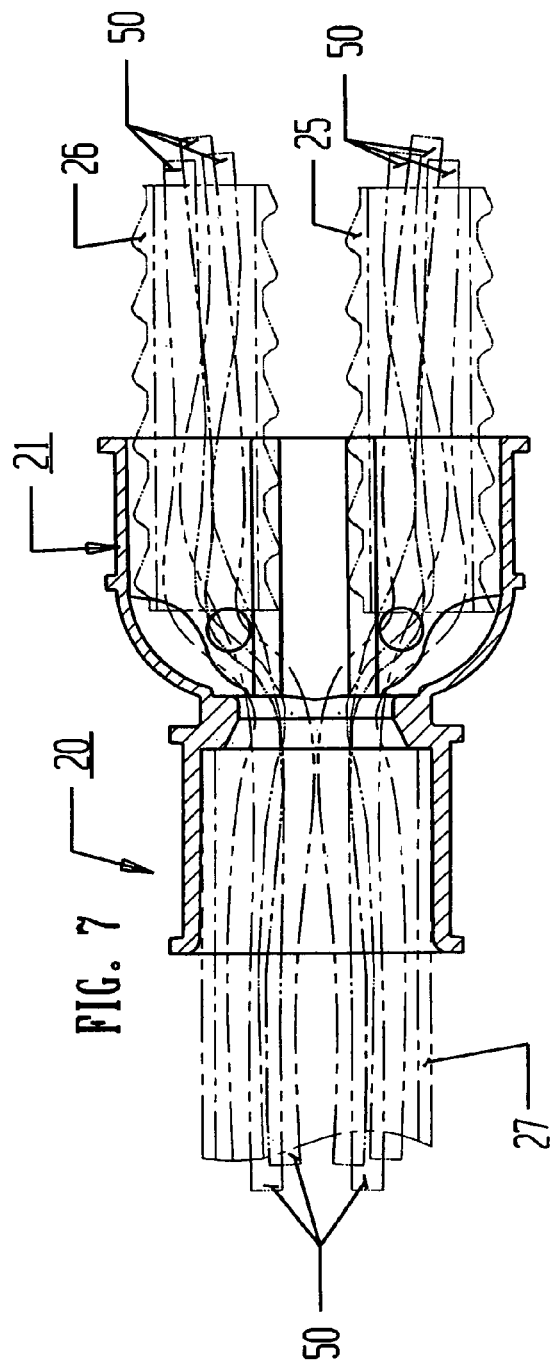

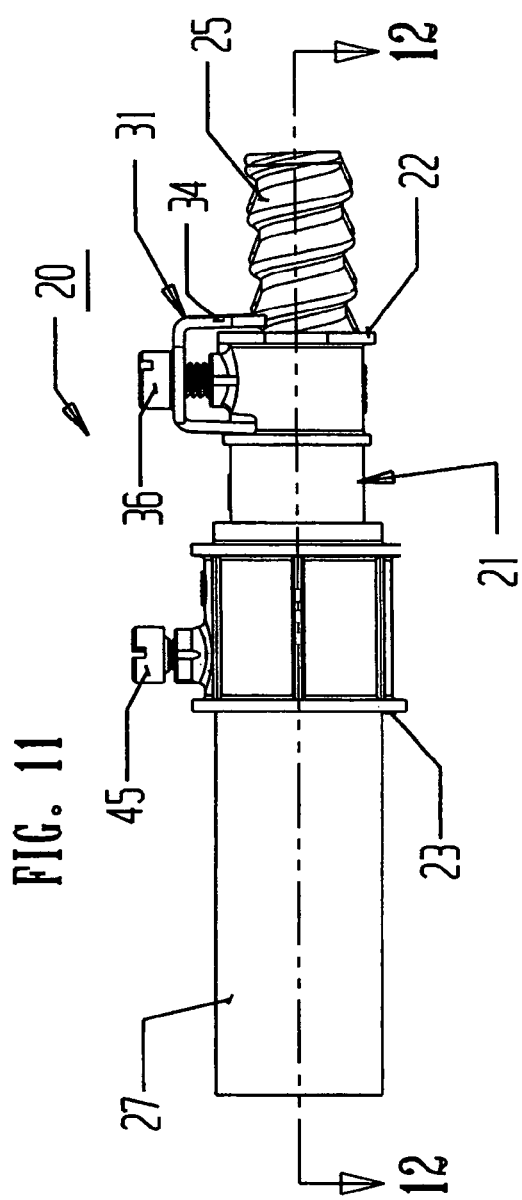
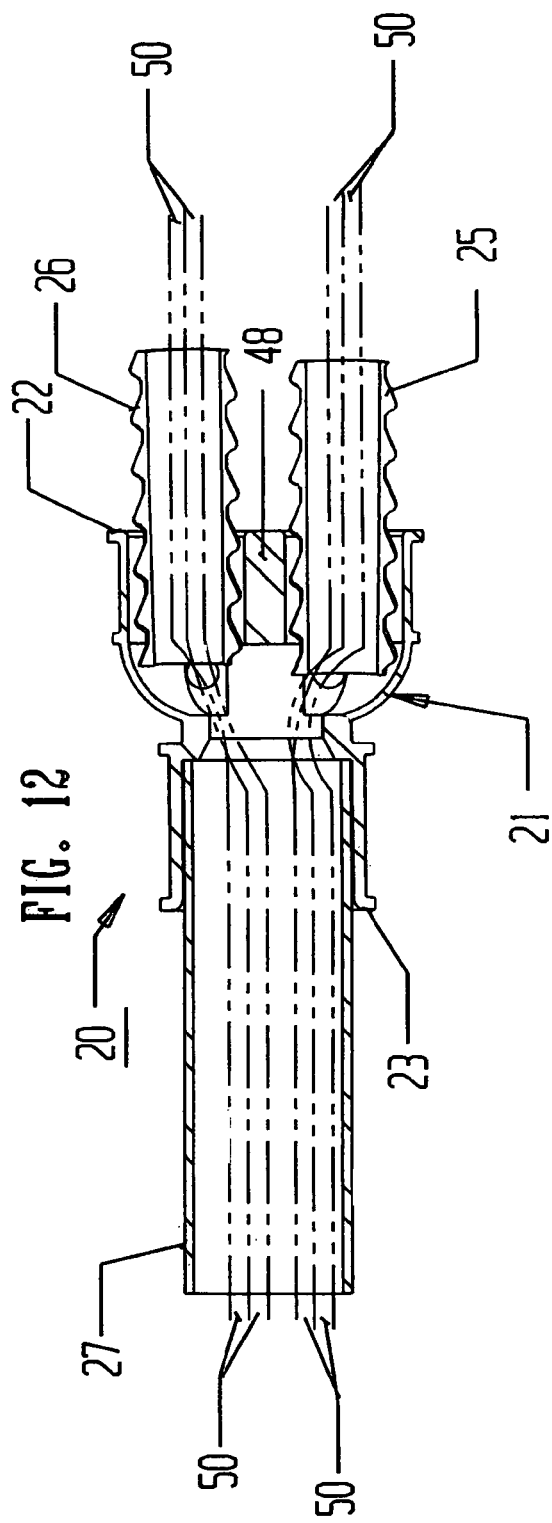

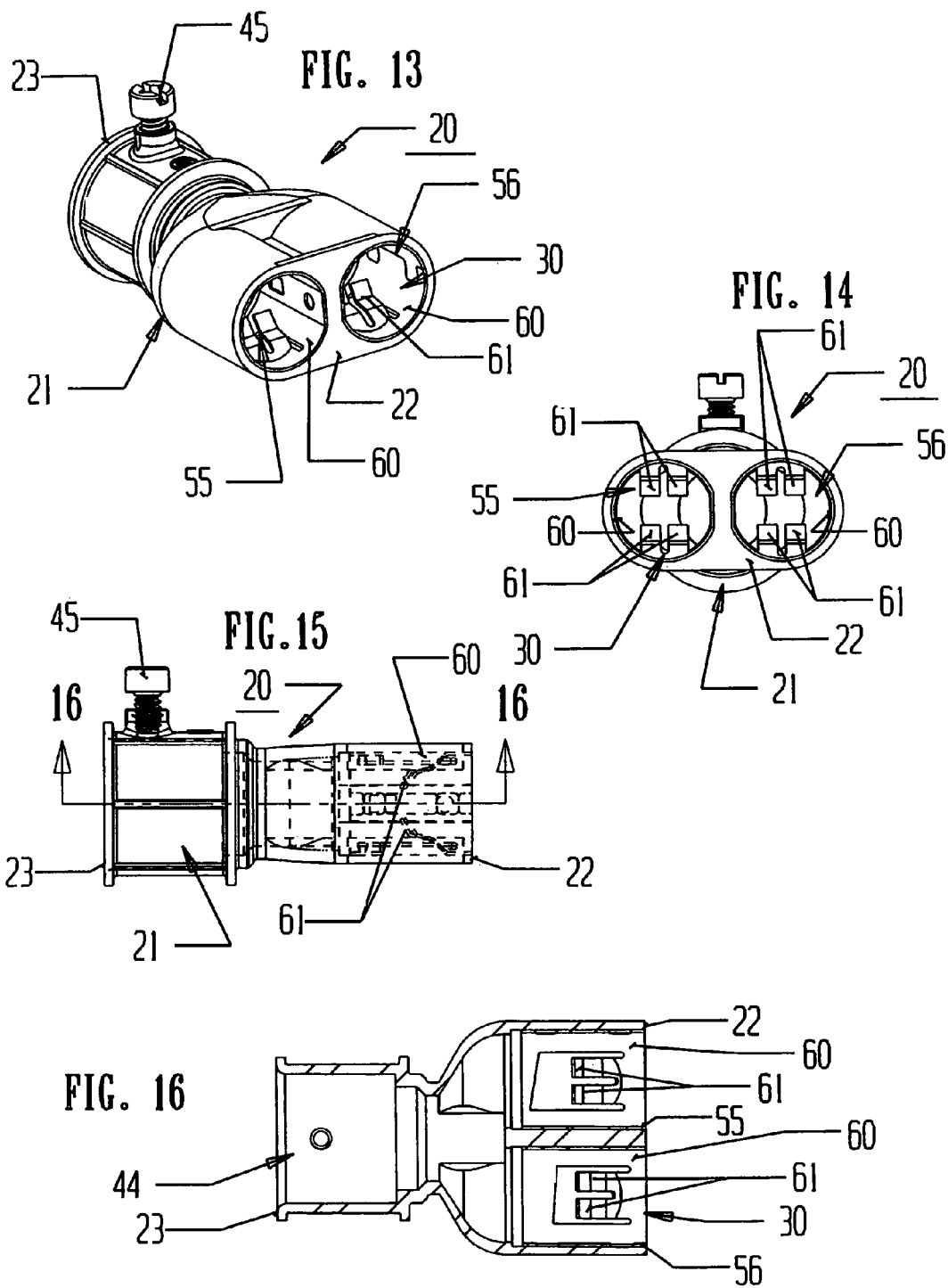

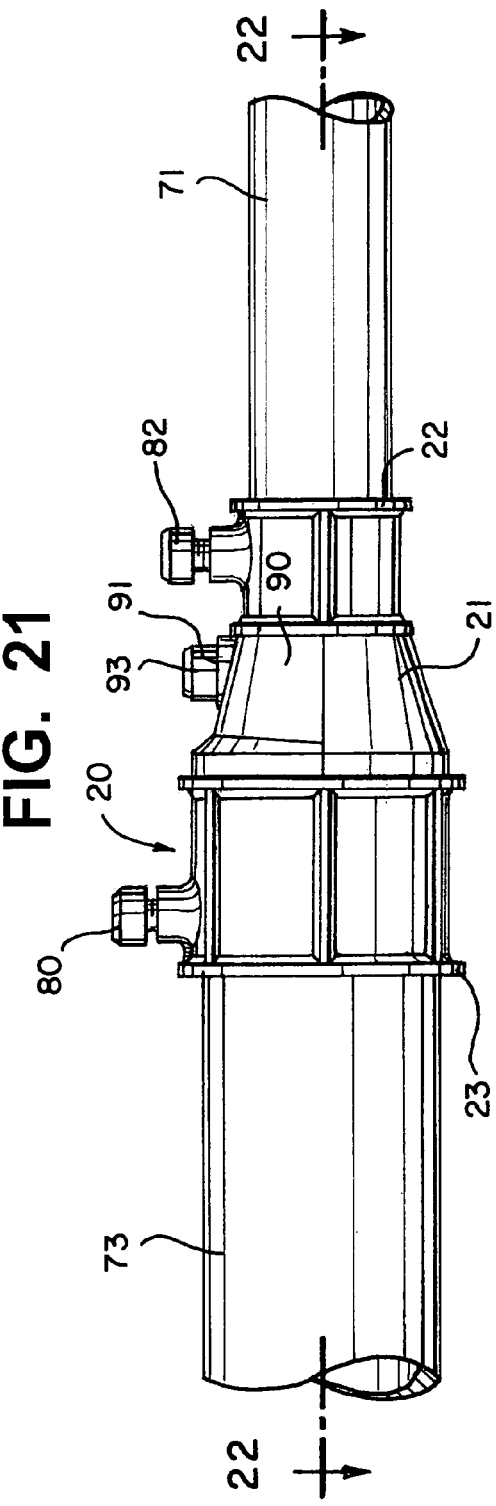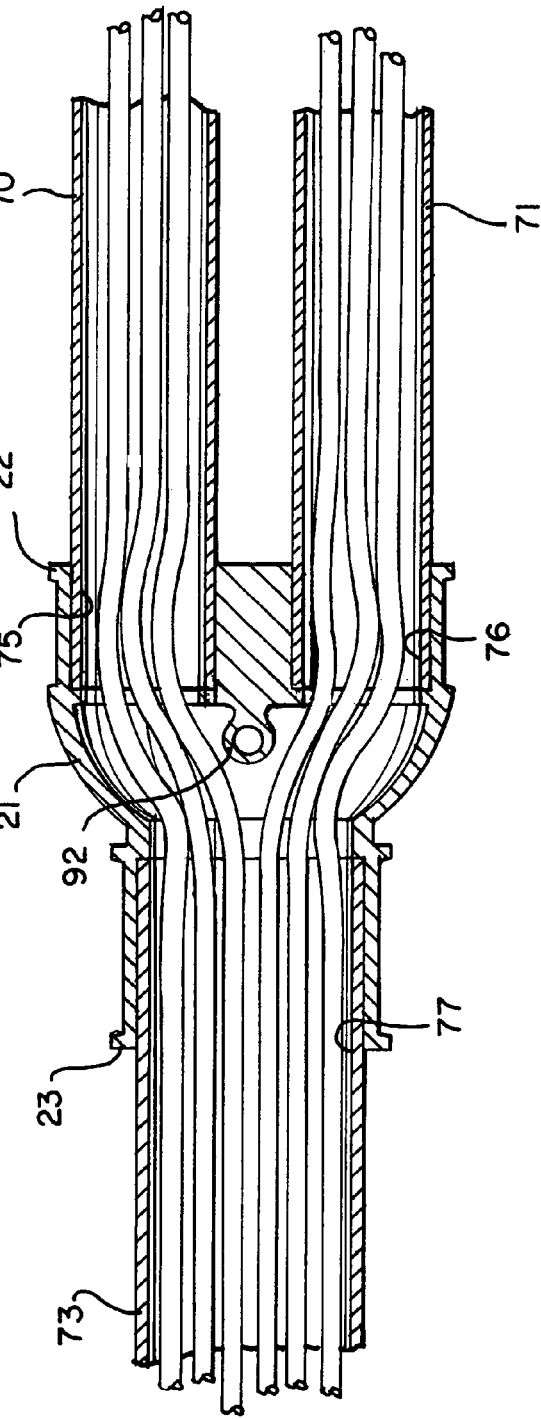

ELECTRICAL CONNECTOR

RELATED DATA

This application is a continuation-in-part of U.S. patent application Ser. No. 12/214,955, filed Jun. 24, 2008 now U.S. Pat. No. 7,582,831 entitled ELECTRICAL CONNECTOR which is a continuation-in-part of U.S. patent application Ser. No. 11/713,264, filed Mar. 2, 2007 now U.S. Pat. No. 7,402,752 entitled ELECTRICAL CONNECTOR and is claiming domestic priority under all applicable sections of 35 U.S.C. §120.

TECHNICAL FIELD

This invention relates to electrical connectors, and more particularly, to electrical connectors constructed for securing flexible metal conduits, metal clad sheath cables, and/or solid tubing conduits to solid tubing conduits.

BACKGROUND ART

In the field of wiring homes and buildings, whether for new construction or for improvements or expansion, substantial development and product improvements have been made. Typically, these improvements are directed to enabling installers to securely mount any desired wiring to any desired location in the most efficient and quickest manner.

In any particular installation or location, various conduits or cables must be interconnected to each other as well as connected to the primary power supply in a suitable power distributing outlet box, junction box, or other enclosure. In each of these instances, flexible metal conduits, armored or metal clad cables, and/or solid, rigid metal conduits or tubing, within which the electrical power carrying wires are contained, must be securely mounted to the housing of a junction box or outlet box, or connected to an appropriate solid or rigid metal tubing or conduit.

In order to enable installers to securely mount flexible metal conduits, armored or metal clad cables, and/or solid, rigid metal conduits or tubing to any desired junction box or outlet box, numerous prior art connectors have been developed. However, in spite of the substantial effort that has been expended in developing such connectors, no prior art system has been developed which enables two flexible metal conduits, armored or metal clad cables, and/or solid, rigid metal conduits or tubing to be mounted together in combination with a single elongated, solid or rigid tubing/conduit.

In general, the industry manufacturers and suppliers provide numerous constructions for enabling a single flexible metal conduit and/or metal clad or armored cable to be securely mounted to either a junction box or outlet box or to an elongated, solid or rigid tubing or conduit. However, during the installation of electrical wires, various instances occur wherein an installer wishes to interconnect two flexible metal conduits, armored or metal clad cables, and/or solid, rigid metal conduits or tubing to a single elongated, solid or rigid tubing/conduit. However, no prior art connector of this nature exists and installers are required to employ connectors that are not designed for this configuration, or are required to use metal junction boxes.

Therefore, it is a principal object of the present invention to provide a connector which enables the secure, rapid, mounted interengagement and retention of two separate and independent flexible metal conduits, armored or metal clad cables, and/or solid, rigid metal conduits or tubing with a single elongated, solid or rigid tubing/conduit.

Another object of the present invention is to provide a connector having the characteristic features described above which is capable of being employed quickly and easily, for securely mounting two separate and independent flexible metal conduits, armored or metal clad cables, and/or solid, rigid metal conduits or tubing directly to a single solid or rigid tubing/conduit without difficulty.

Another object of the present invention is to provide a connector having the characteristic features described above which enables the entire assembly of the two separate and independent flexible metal conduits, armored or metal clad cables, and/or solid, rigid metal conduits or tubing to be achieved quickly and easily by a single individual.

Other a more specific objects will in part be obvious and will in part appear hereinafter.

SUMMARY OF THE INVENTION

By employing the present invention, all of the difficulties and drawbacks of the prior art systems have been overcome and an efficient, easily manufactured and easily assembled connector is realized. Furthermore, using the connector of the present invention, two separate and independent flexible metal conduits, two separate armored or metal clad cables, and/or two separate elongated, rigid or solid electrical tubings/conduits are quickly and easily secured to the connector for being mounted directly to a single elongated rigid or solid electrical tubing/conduit. By employing the present invention, complete assurance is provided that the entire mounting operation can be achieved by a single operator both quickly and easily.

In its preferred construction, the dual or duplex conduit/cable connector of the present invention is constructed for receiving two separate and independent flexible metal conduits, armored or metal clad cables, and/or rigid electrical tubes/conduits and enabling the two conduit/cables to be securely affixed to one end of the connector. In order to assure rapid, easy, and efficient assembly of the two flexible metal conduits, armored or metal clad cables, and/or rigid electrical tubes/conduits to the duplex connector of the present invention, the connector preferably incorporates a clamping bracket or locking screw associated therewith.

Although the clamping bracket may be formed in a wide variety of alternate configurations, in the preferred embodiment, two separate U-shaped brackets are mounted at one end of the duplex connector with one side of each bracket being mounted in a receiving slot formed in the connector. The second end of each bracket overlies the receiving aperture of the connector and is positioned for directly contacting the outside surface of the flexible metal conduit and/or armored or metal clad cable mounted thereto. In addition, the central portion of the U-shaped bracket incorporates a threaded aperture which is cooperatively associated with a locking screw threadily engaged with the connector.

By employing this preferred construction, two separate and independent flexible metal conduits and/or armored or metal clad cables are inserted into the receiving aperture formed at one end of the duplex connector and are securely mounted in the desired position. In order to assure secure mounted engagement of each conduit/cable in the connector, each of the two U-shaped clamping brackets are employed.

In this regard, each clamping bracket is released for enabling the two flexible metal conduits and/or armored metal clad cables to be fully inserted into the duplex connector. Once fully inserted therein, the clamping brackets are secured by rotating the locking screws, causing the two sides of the bracket to be drawn downwardly into abutting contact with the outer surface of the flexible metal conduit and/or armored or metal clad cables. In this regard, one side of the bracket securely engages the conduits/cable at the opening of the connector, while the other side of the bracket, which passes through the slot formed in the connector, engages the outer surface of the conduit/cable directly within the connector. In this way, assurance is provided that both flexible metal conduits and/or armored or metal clad cables are securely affixed to the duplex connector.

In an alternate preferred embodiment of the present invention, the dual or duplex conduit/cable connector of the present invention is constructed with two locking rings or sleeves mounted in one end of the connector in adjacent relationship with each locking ring/sleeve being constructed for enabling a separate and independent flexible metal conduit and/or armor or metal clad cable to be inserted and lockingly engaged therein. In this way, two separate and independent flexible metal conduits and/or armor or metal clad cables are quickly and easily securely affixed to one end of the connector.

In a preferred construction, each of the locking rings/sleeves is mounted in secure, locked engagement in one end of the connector of the present invention, with each locking ring/sleeve incorporating a plurality of flexible arms or fingers extending therefrom in position for lockingly engaging the outer surface of the metal conduit and/or armor or metal clad cable inserted therein. In this way, any desired pair of metal conduits and/or armor or metal clad cables are quickly and easily mounted to the same end of the connector of the present invention and securely affixed thereto.

In a still further alternate embodiment of the present invention, the dual or duplex conduit/cable connector of the present invention is constructed for enabling two rigid conduits or solid tubing conduits, such as electrical metal tubings (EMT) to be fully inserted into the duplex connector for secure engagement therewith. In this regard, by telescopically advancing the two desired solid or rigid tubing/conduits into the duplex connector of the present invention, the two rigid tubing/conduits are securely affixed thereto, preferably by employing locking screws mounted to the end of the connector for enabling the tubing/conduits to be securely locked in the desired position.

In the preferred construction of this embodiment of the present invention, the duplex connector is constructed with a removable cover, which enables the installer to quickly and easily open the connector to view the position of any electrical wires being inserted therethrough, as well as control the positioning of the wires. In this regard, in certain installations, it is important to be able to control the movement of electrical wires through the duplex connector, in order to be certain that the wires are transferred from one rigid tubing/conduit into the two separate and independent rigid tubing/conduits, with each of the wires being advanced into the appropriate tubing/conduit. By incorporating a removable cover as an integral component of the duplex connector, assurance is provided that installation ease and convenience is achieved.

Once the two flexible metal conduits, armored or metal clad cables, and/or rigid electrical tubes/conduits are securely affixed in the desired position in the duplex connector of the present invention, the opposed end of the connector is securely affixed to any desired rigid conduit or solid tubing conduit, such as an electrical metal tubing (EMT). This secure affixation is quickly and easily achieved by telescopically advancing the receiving end of the duplex connector of the present invention onto the desired solid or rigid tubing/conduit and then securely affixing the connector directly to the tubing/conduit. This secure affixation is most easily achieved by employing a locking screw incorporated in the mounting end of the connector. Once completed, the duplex connector of the present invention is securely mounted in the precisely desired position with all of the component quickly and easily affixed thereto.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 6 is a cross-sectional side elevation view of the duplex connector of FIG. 2 with the solid or rigid tubing/conduit shown in phantom;

FIG. 7 is a cross-sectional top plan view of the duplex connector of FIG. 6;

FIG. 11 is a side elevation view of the duplex connector of FIG. 9, shown mounted to a solid or rigid tubing/conduit at one end thereof with two separate and independent flexible metal conduits and/or armor or metal clad cables securely affixed to the opposed end thereof;

FIG. 12 is a cross-sectional top plan view of the duplex connector of FIG. 11 taken along line 12-12;

FIG. 13 is a front perspective view of an alternate embodiment of the duplex connector of the present invention;

FIG. 14 is a front elevation view of the duplex connector of FIG. 13;

FIG. 15 is a side elevation view of the duplex connector of FIG. 14;

FIG. 16 is a cross-sectional bottom plan view of the duplex connector of FIG. 15 taken along line 16-16;

FIG. 21 is a side elevation view of the multiple conduit connector of FIG. 20;

FIG. 22 is a cross-sectional top plan view of the multiple conduit connector of the present invention taken along the line 22-22 of FIG. 21;

DETAILED DISCLOSURE

By referring to FIGS. 1-28, along with the following detailed discussion, the construction and operation of alternate embodiments of the duplex conduit/cable connector of the present invention can best be understood. Although the following disclosure and associated drawings fully and completely depict the preferred embodiments of the present invention, further alternate constructions can be made without departing from the scope of this invention. As a result, it is to be understood that all such alternate constructions and variations are intended to be within the scope of the present invention and encompassed therein.

Figure 1:
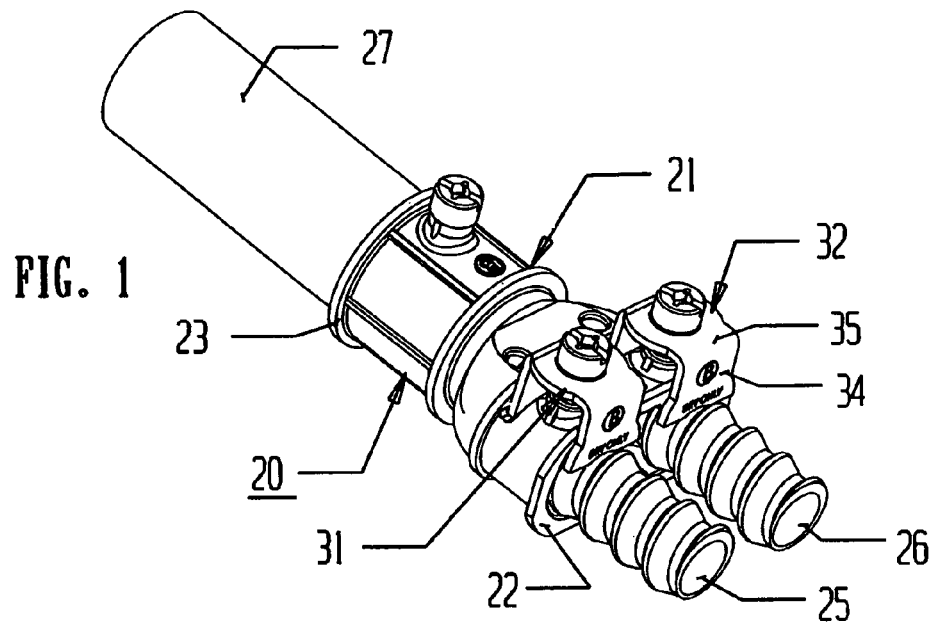
FIG. 1 is a front perspective view of the duplex connector of the present invention shown mounted to a solid or rigid tubing/conduit at one end thereof with two separate and independent flexible metal conduits and/or armored clad cables securely affixed to the opposed end thereof.
Figure 2:
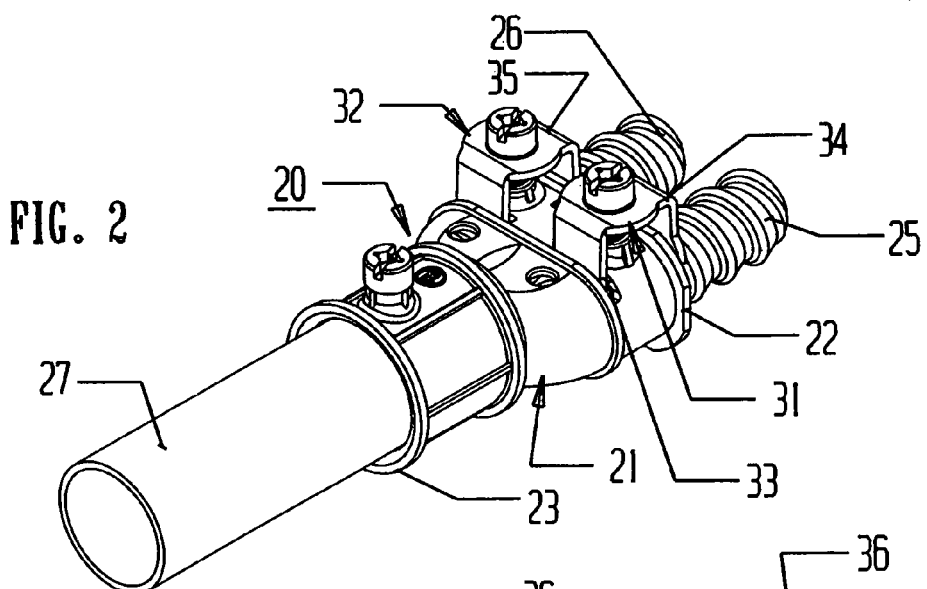
FIG. 2 is a front perspective view of the duplex connector of FIG. 1.
Figure 3:
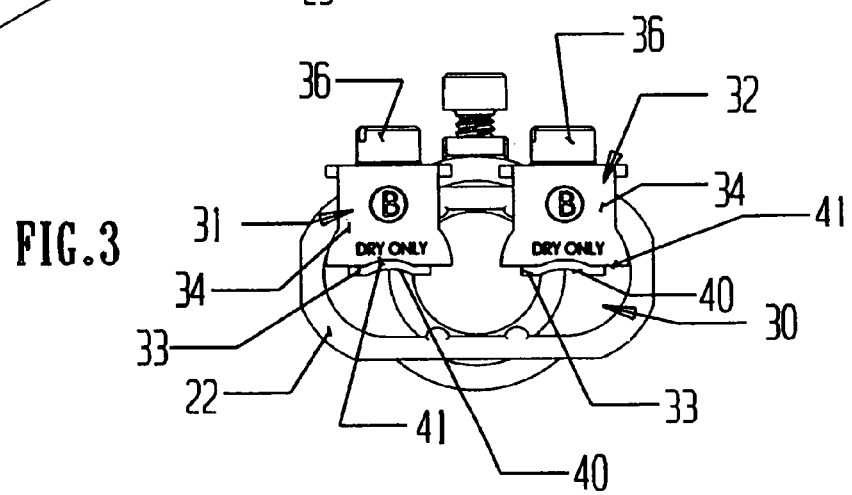
FIG. 3 is a front elevation view of the duplex connector of FIG. 2, with the two flexible metal conduits and/or armored clad cables removed therefrom.
Figure 4:
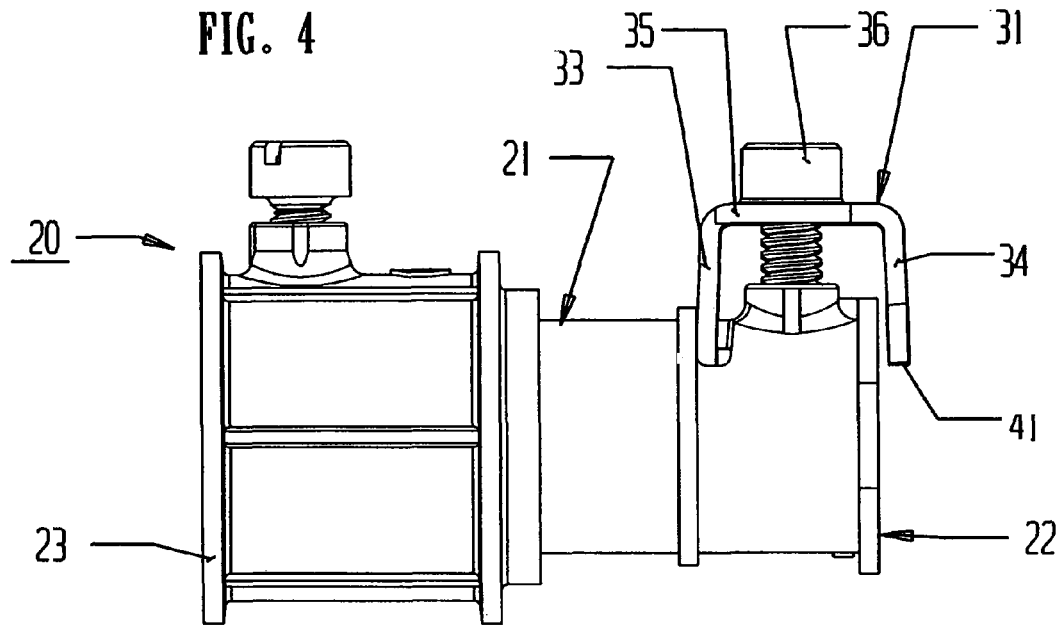
FIG. 4 is a side elevation view of the duplex connector of FIG. 3.
Figure 5:
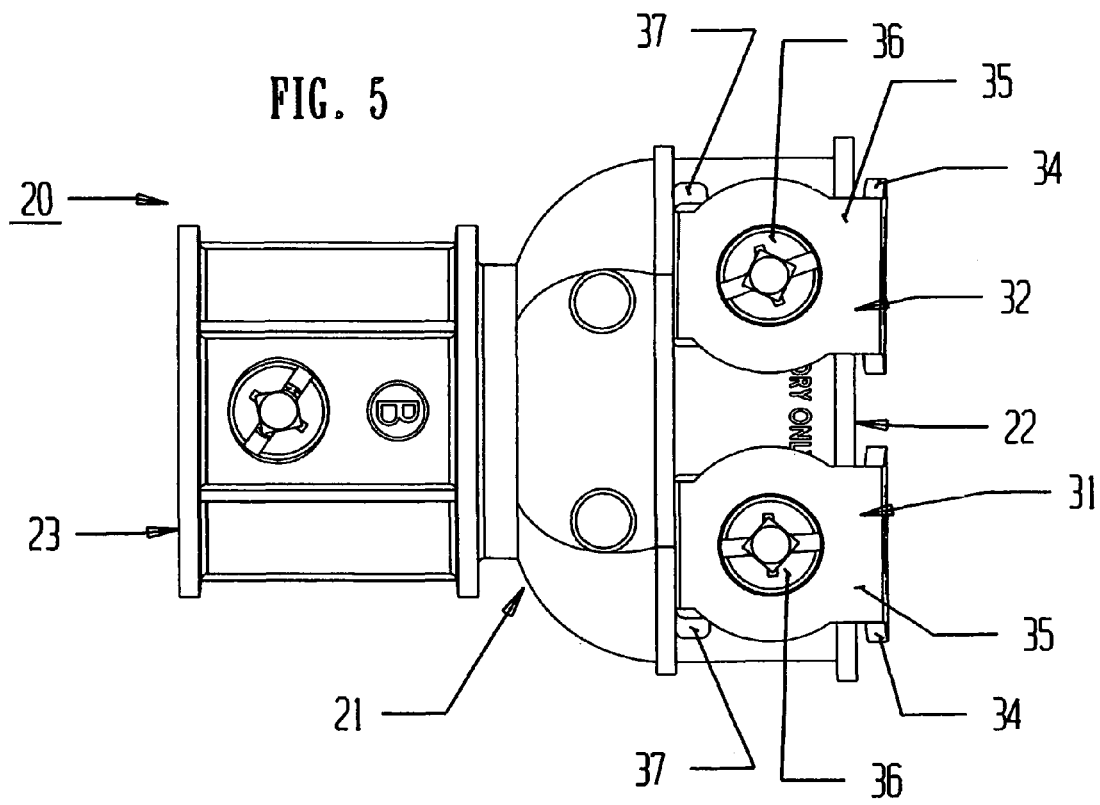
FIG. 5 is a top plan view of the duplex connector of FIG. 3.
Figure 8:
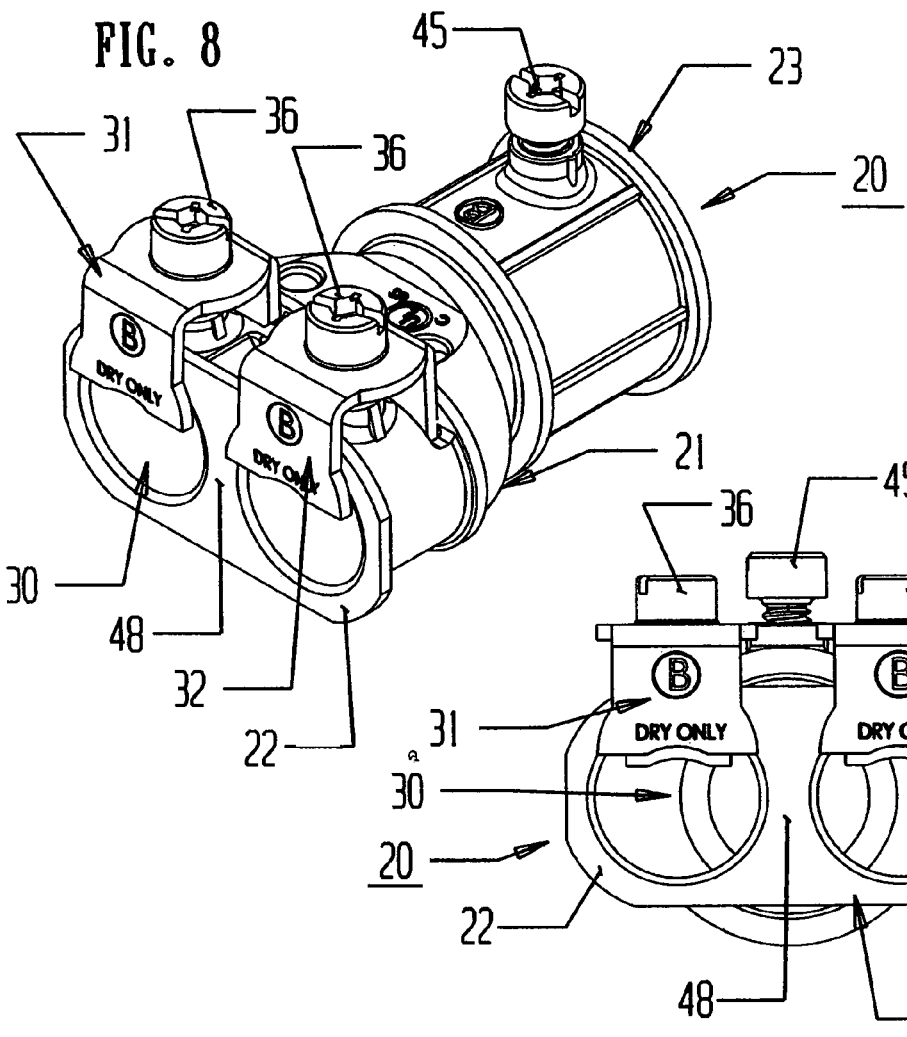
FIG. 8 is a front perspective view of a modified embodiment of the duplex connector of FIG. 1.
Figure 9:
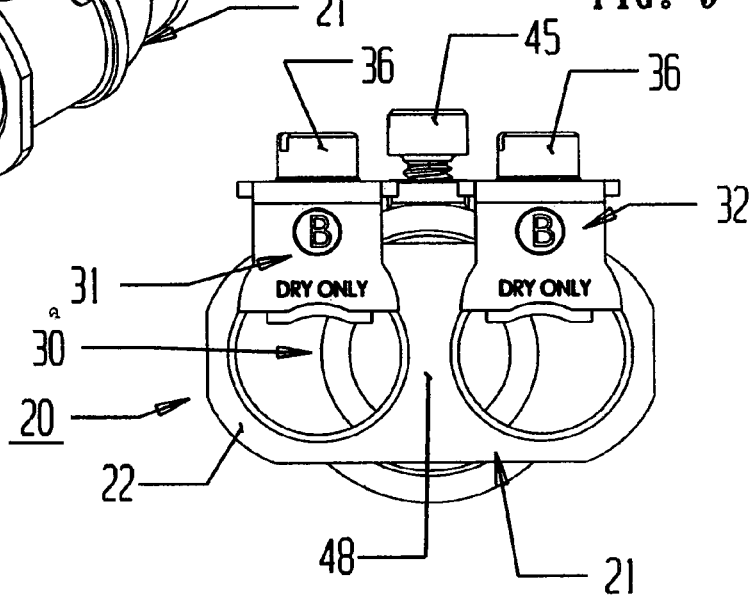
FIG. 9 is a front elevation view of the duplex connector of FIG. 8.
Figure 10:
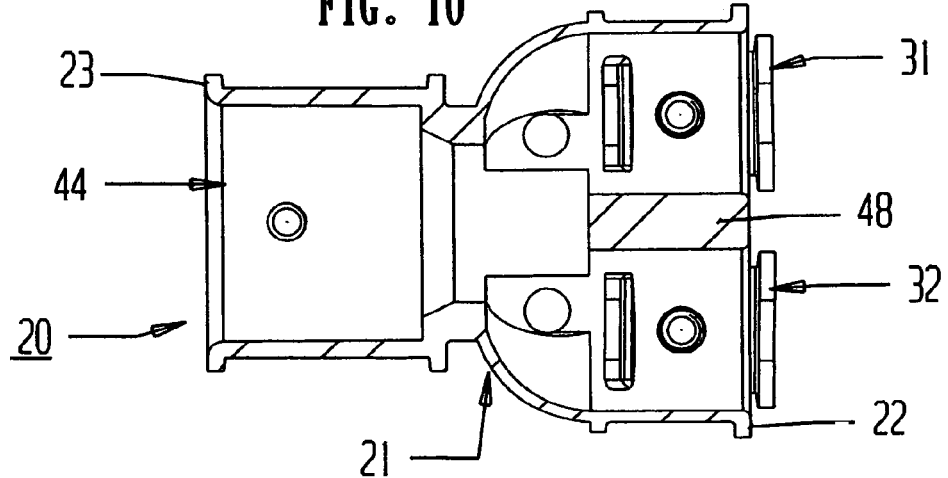
FIG. 10 is a cross-sectional bottom plan view of the duplex connector of FIG. 9.
Figure 17:
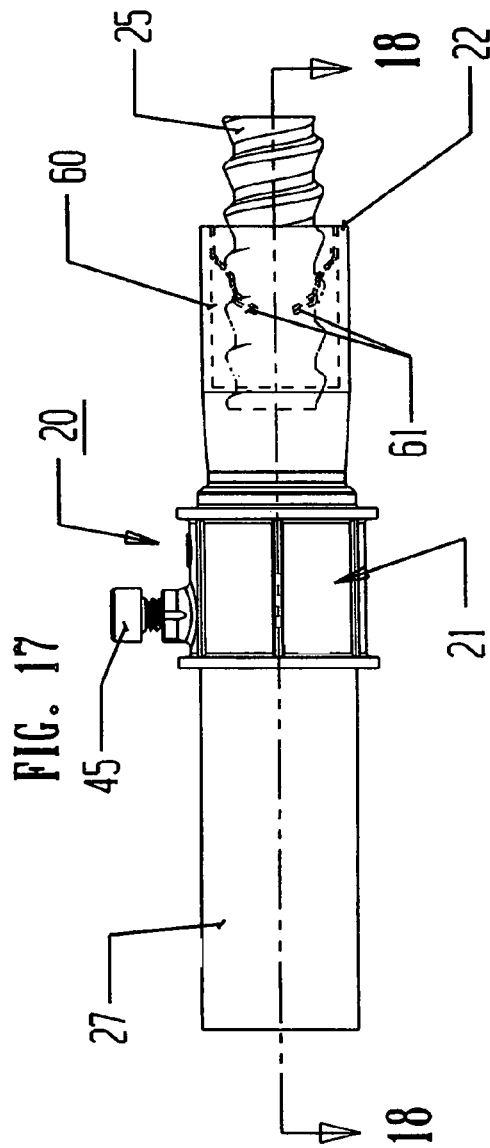
FIG. 17 is a side elevation view of the duplex connector of FIG. 13 shown mounted to a solid or rigid tubing/conduit at one end thereof with two separate and independent flexible metal conduits and/or armored or metal clad cables securely affixed to the opposed end thereof.
Figure 18:
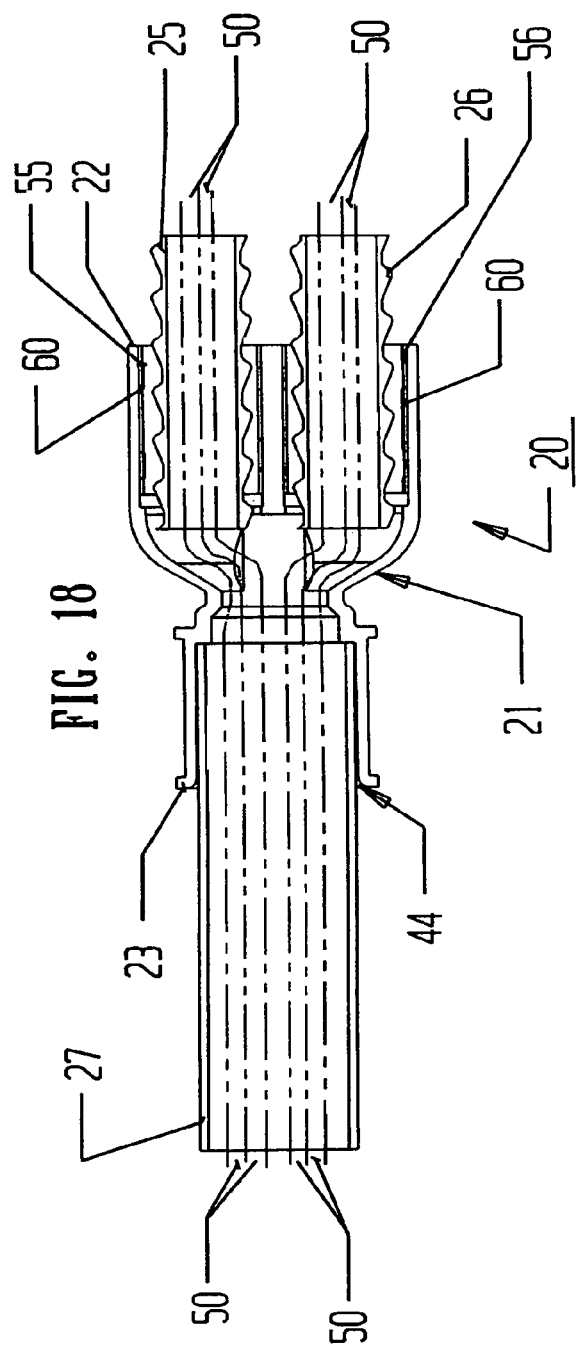
FIG. 18 is a cross-sectional top plan view of the duplex connector of FIG. 17 taken along line 18-18.
Figure 19:
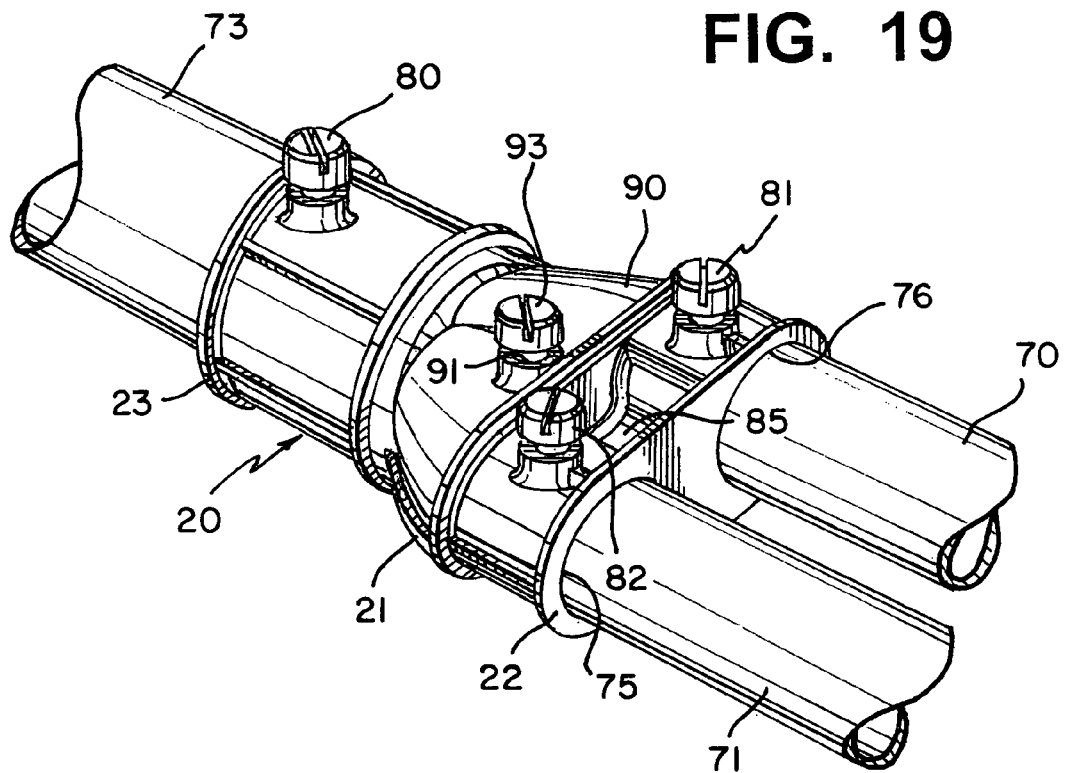
FIG. 19 is a front perspective view of the multiple conduit connector of the present invention shown mounted to a solid or rigid tubing/conduit at one end thereof, with two separate and independent solid or rigid tubings/conduits securely affixed to the opposed end thereof.
Figure 20:
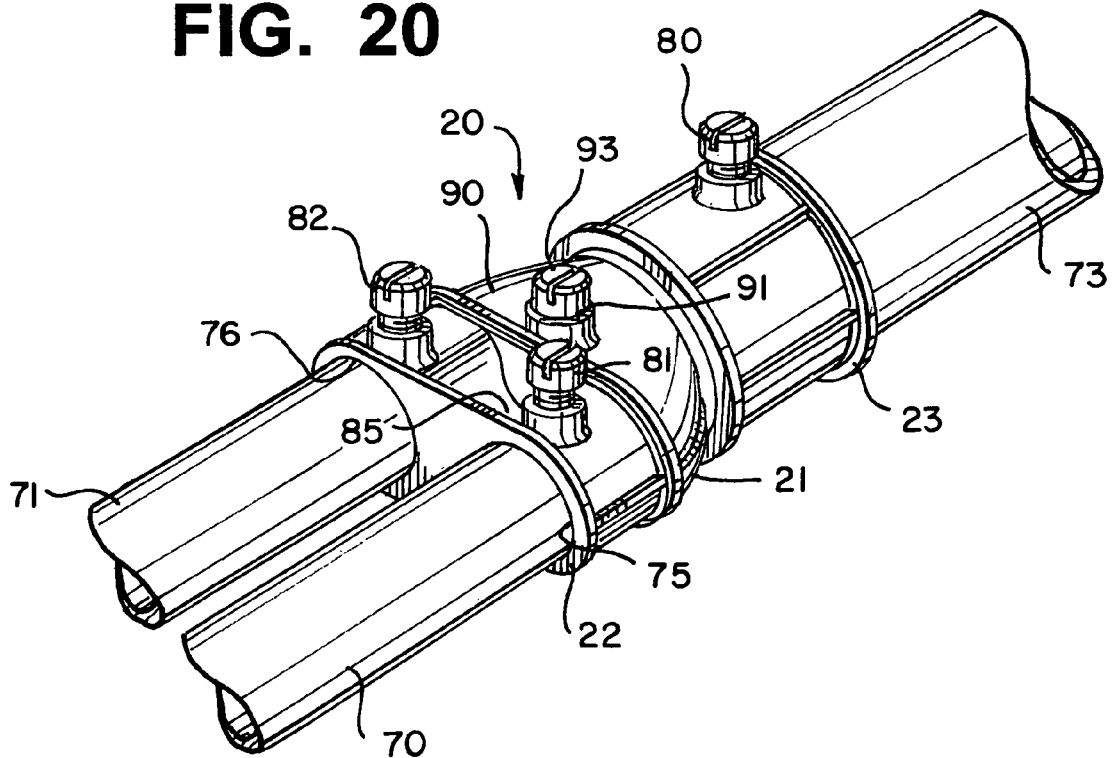
FIG. 20 is a front perspective view of the multiple conduit connector of FIG. 19.

In FIGS. 1 and 2, dual or duplex conduit/cable connector 20 is depicted incorporating body member 21, front end 22, and rear end 23. In addition, dual/duplex conduit/cable connector 20 is shown with flexible metal conduits and/or armored or metal clad cables 25 and 26 securely mounted to front end 22, while solid or rigid metal tubing or conduit 27 is shown securely affixed to rear end 23 of connector 20. As a result, FIGS. 1 and 2 depict duplex conduit/cable connector 20 of the present invention in its fully assembled configuration.

As is evident from a review of FIGS. 1 and 2, duplex conduit/cable connector 20 of the present invention enables two separate and independent flexible metal conduits and/or armored or metal clad cables 25 and 26 to be quickly and easily securely affixed to connector 20 for enabling the electrical conducting wires retained within cables 25 and 26, as shown and fully detailed below, to be easily carried through solid or rigid tube/conduit 27. In this way, solid tubing conduit, such as electrical metal tubing (EMT) or rigid conduits can be quickly and easily interconnected with two separate and independent flexible metal conduits or cables, thereby providing installation ease and efficiency.

By referring to FIGS. 1-7, along with the following detailed description, the construction and operation of dual or duplex conduit/cable connector 20 of the present invention can best be understood. As depicted, dual/duplex conduit/cable connector 20 incorporates an enlarged front end 22 formed in body member 21 with front end 22 incorporating portal 30 which is constructed for receiving flexible metal conduits and/or armored or metal clad cables 25 and 26 therein. In order to assure that flexible metal conduit and/or armored or metal clad cables 25 and 26 are securely retained in the precisely desired position, connector 20 incorporates brackets 31 and 32.

In the preferred construction, brackets 31 and 32 each comprise a generally U-shape, formed by wall portions 33 and 34, and interconnecting portion 35. In addition, each of brackets 31 and 32 is cooperatively associated with screw 36 which securely affixes brackets 31 and 32 to body member 21. In this regard, body member 21 incorporates two slots 37 formed therein, each of which is constructed for receiving wall portion 33 of either bracket 31 or 32. In addition, screw 36 is readily engaged with brackets 31 and 32, as well as with body member 21, in order to securely maintain and position brackets 31 and 32 in the precisely desired location.

As depicted, by employing this construction, brackets 31 and 32 are cooperatively associated with front end 22 of body member 21, with wall portion 34 of each bracket 31 and 32 positioned in juxtaposed, spaced, cooperating relationship with portal 30 of front end 22. In addition, wall portion 33 of each bracket 31 and 32 extends through slot 37 of body member 21 for enabling the lower edge thereof to be positioned within the interior of body member 21.

In this way, as best seen in FIGS. 1 and 2, flexible metal conduits and/or armored or metal clad cables 25 and 26 are able to be quickly and easily inserted into portal 30 of front end 22 of body member 21, with brackets 31 and 32 positioned to allow flexible metal conduits and/or armored or metal clad cables 25 and 26 to be easily inserted into connector 20. Once flexible metal conduit and/or armored or metal clad cables 25 and 26 are axially advanced into portal 30 of body member 21 and placed in the desired position within body member 21 of connector 20, screws 36 are rotated for causing brackets 31 and 32 to be advanced into clamping engagement with the outer surface of flexible metal conduit and/or armored or metal clad cables 25 and 26.

In this regard, in the preferred construction, wall portion 33 of brackets 31 and 32 is constructed with arcuately curved zone 40 formed in the terminating edge thereof, while wall portion 34 of brackets 31 and 32 incorporates arcuately curved zone 41 formed in its terminating edge. In the preferred construction, arcuately curved zones 40 and 41 are constructed with a radius of curvature consistent with the radius of curvature found on the outer surface of flexible metal conduits and/or armored or metal clad cables 25 and 26. As a result, once flexible metal conduit and/or armored or metal clad cables 25 and 26 are inserted into front end 22 of body member 21, the advance of brackets 31 and 32 into clamping engagement with the outer surface of cables 25 and 26 enables arcuately curved zones 40 and 41 to securely contact and engage the outer surface of cables 25 and 26, assuring that cables 25 and 26 are securely affixed and retained in body member 21 of dual/duplex conduit/cable connector 20, preventing unwanted axial removal of cables 25 and 26 from connector 20.

In completing the installation of dual/duplex conduit/cable connector 20 in a typical application, connector 20 is securely mounted to a desired solid or rigid tube/conduit 27. In achieving this result, portal 44 is formed in rear end 23 of connector 20, with portal 44 being constructed for enabling solid or rigid tube/conduit 27 to be telescopically inserted through portal 44 into engagement with connector 20. Once inserted in position, locking screw 45 mounted to connector 20 directly adjacent portal 44 is a threadedly advanced into contact with solid or rigid tube/conduit 27, for securely affixing connector 20 to solid or rigid tube/conduit 27, thereby completing the installation and affixation of connector 20 in an easily achieved manner.

As is well known in the art, flexible metal conduit and/or armored or metal clad cables 25 and 26 are employed for carrying electrical wires 50 and enabling wires 50 to be distributed to the various locations for achieving the desired electrical connections. In this regard, whenever a large number of electrical wires 50 are distributed through a particular location, solid or rigid tubes/conduits 27 are employed, such as electrical metal tubing (EMT) or rigid conduits.

In employing the present invention, individual flexible metal conduits and/or armored or metal clad cables 25 and 26 are quickly and easily affixed to dual/duplex conduit/cable connector 20 of the present invention for enabling electrical wires 50 mounted in the individual flexible metal conduits and/or armored or metal clad cables 25 and 26 to be combined and carried through a single, elongated, solid or rigid tube/conduit 27. This desirable result is easily achieved using dual/duplex conduit/cable connector 20 with the final assembly being depicted in FIGS. 6 and 7.

In FIGS. 8-12, an alternate embodiment of dual/duplex conduit/cable connector 20 of the present invention is depicted. In this embodiment, connector 20 is constructed in a manner which is virtually identical to the construction detailed above and shown in FIGS. 1-7. For this reason, FIGS. 8-12 incorporate the same reference numerals wherein the identical structural elements are depicted. Furthermore, the detailed discussion provided above regarding the embodiment of connector 20 shown in FIGS. 1-7 is hereby repeated and incorporated by reference.

As shown in FIGS. 8-12, this alternate embodiment of dual/duplex conduit/cable connector 20 differs only in the construction employed for forming enlarged portal 30 of front end 22 of connector 20. In this embodiment, enlarged portal 30 incorporates divider wall 48 formed therein, effectively forming two separate and independent holdings zones for flexible metal conduits and/or armor or metal clad cables 25 and 26.

As depicted, divider wall 48 is constructed substantially midway in enlarged portal 30 of front end 22 in order to establish two substantially identically dimensioned holding or receiving zones for flexible metal conduits and/or armor or metal clad cables 25 and 26. In this way, once flexible metal conduits and/or armor clad or metal cables 25 and 26 are mounted and securely affixed to connector 20, assurance is provided that each of flexible metal conduit and/or armor or clad cable 25 and 26 are completely independent of each other and are incapable of contacting each other.

In this way, electrical independence of each flexible metal conduit and/or armor or metal clad cable is assured and continuous, trouble-free electrical transmission and operation is provided. Although the previous embodiment detailed above and shown in FIGS. 1-7 effectively provides the desired identical electrical independence of each flexible metal conduit and/or armor or metal clad cable mounted therein, this alternate embodiment with divider wall 48 formed therein provides an enhanced level of assurance that contact between the flexible metal conduits and/or armored or metal clad cables is impossible to occur.

As is evident from the depiction provided in FIGS. 11 and 12, by employing this alternate embodiment of the present invention, individual flexible metal conduits and/or armor or metal clad cables 25 and 26 are quickly and easily affixed to dual/duplex conduit/cable connector 20 for enabling electrical wires 50 mounted in the individual flexible metal conduits and/or armored or metal clad cables 25 and 26 to be combined and carried through a single, elongated, solid or rigid tube/conduit 27, with complete assurance that electrical wires 50 of each flexible metal conduit and/or armored or metal clad cable remain completely independent. This desirable result is easily achieved using this embodiment of dual/duplex conduit/cable connector 20.

In FIGS. 13-18, a further alternate embodiment of the present invention is depicted. In this embodiment, dual/duplex conduit/cable connector 20 is depicted having a construction similar to the embodiment of connector 20 detailed above and shown in FIGS. 1-12. However, as detailed below, instead of incorporating holding brackets for securely maintaining flexible metal conduits and/or armored or metal clad cables 25 and 26 in position, this embodiment incorporates locking rings or sleeves 60 constructed for receiving and lockingly retaining the desired flexible metal conduits and/or armored or metal clad cables 25 and 26 in the precisely desired position. As detailed below, regardless of the embodiment employed, the identical goals and objectives of enabling flexible metal conduits and/or armored or metal clad cables 25 and 26 to be quickly and easily secured to connector 20 with the entire assembly being mounted to any desired solid or rigid metal tube/conduit 27 is achieved.

As shown in FIGS. 13-18, in this alternate embodiment, dual/duplex conduit/cable connector 20 comprises body member 21, which incorporates enlarged front end 22, and rear end 23. In addition, enlarged front end 22 incorporates enlarged portal zone 30 formed therein which comprises receiving zones 55 and 56. Furthermore, receiving zones 55 and 56 each incorporate separate, substantially cylindrically shaped locking rings or sleeves 60.

In the preferred construction, each substantially cylindrically shaped locking ring/sleeve 60 incorporates a plurality of finger members 61 radially extending inwardly from the outer surface of locking ring/sleeve 60. By employing this construction, flexible metal conduits and/or armored or metal clad cables 25 and 26 are inserted into receiving zones 55 and 56 of enlarged portal 30 of front end 22, enabling finger members 61 to lockingly contact and engage the outer surface of flexible metal conduits and/or armored or metal clad cables 25 and 26.

In this regard, as flexible metal conduit and/or armored or metal clad cable 25 is telescopically inserted into locking ring/sleeve 60 of receiving zone 55, the outer surface thereof is advanced into contact and engagement with finger members 61 of locking ring/sleeve 60. As flexible metal conduit and/or armor or metal clad cable 25 is telescopically advanced into further engagement with locking ring/sleeve 60, finger members 61 arcuately pivot or flex for enabling flexible metal conduit and/or armored or metal clad cable 25 to move inwardly, while lockingly engaging the outer surface of flexible metal conduit and/or armored or metal clad cable 25 to prevent its removal from receiving zone 55.

In this way, once flexible metal conduit and/or armored or metal clad cable 25 has been telescopically advanced completely into receiving zone 55, cable 25 is securely maintained in locked engagement therein. In addition, electrical wires 50 contained in flexible metal conduit and/or armored or metal clad cable 25 are advanced through connector 20 and solid or rigid metal tubing/conduit 27 secured thereto for enabling wires 50 to be fed and connected to a desired location.

In completing the desired assembly, flexible metal conduit and/or armored or metal clad cable 26 is telescopically inserted into locking ring/sleeve 60 of receiving zone 56 in order to enable the outer surface thereof to be advanced into contact and engagement with finger members 61 of locking ring/sleeve 60. As flexible metal conduit and/or armor or metal clad cable 26 is telescopically advanced into further engagement with locking ring/sleeve 60, finger members 61 arcuately pivot or flex for enabling flexible metal conduit and/or armored metal clad cable 26 to move inwardly, while lockingly engaging the outer surface of flexible metal conduit and/or armored or metal clad cable 26 to prevent its removal from receiving zone 56.

Once flexible metal conduit and/or armored metal clad cable 26 has been telescopically advanced completely into receiving zone 56, cable 26 is securely maintained in locked engagement therein. In addition, electrical wires 50 contained in flexible metal conduit and/or armored or metal clad cable 26 are advanced through connector 20 and solid or rigid metal tubing/conduit 27, for enabling wires 50 to be fed and connected to the desired location. In this way, the desired electrical connection is quickly and easily achieved and the goals of the present invention are realized.

By referring to FIGS. 19-28, along with the following detailed disclosure, a still further alternate embodiment of the present invention can best be understood. In this still further alternate embodiment, dual/duplex conduit/cable connector 20 is constructed in a manner generally similar with the embodiments detailed above, with similar reference numerals being used to refer to similar components. In this regard, conduit/cable connector 20 comprises a body member 21, front end 22, and rear end 23.

In this embodiment, dual/duplex conduit/cable connector 20 is constructed for enabling two rigid conduits or solid tubing conduits 70 and 71, such as electrical metal tubings (EMT), to be mounted in front end 22 of connector 20, with a single rigid conduit or solid tubing conduit (EMT) 73 being mounted at the opposed end of the connector 20. Typically, rigid conduits 70 and 71 comprise smaller diameters when compared to rigid conduit 73.

In most typical installations in which electrical wires are installed in various locations for delivering power to a wide variety of end products as well as for a wide variety of purposes, it is often required for a plurality of wires mounted in a single rigid conduit to be separated into two smaller bundles of wires for reaching alternate locations.

Presently, no connector exists in the industry for enabling a construction of this nature to be easily achieved. Instead, installers are required to install electrical junction boxes in which the wires are mounted and separated for distribution into different conduits. However, by employing the present invention, use of such electrical junction boxes is completely eliminated.

In FIGS. 19-22, this embodiment of dual/duplex conduit/cable connector 20 is depicted with solid or rigid tubing/conduits 70 and 71 securely mounted to front end 22 of connector 20, while solid or rigid metal tubing/conduit 73 is shown securely affixed to rear end 23 of connector 20. As a result, as shown in FIGS. 19-22, duplex conduit/cable connector 20 of the present invention is in its fully assembled configuration.

As is evident from a review of these Figures, as well as FIG. 22 in particular, duplex conduit/cable connector 20 of the present invention enables two, smaller diameter, separate and independent solid or rigid tubings/conduits 70 and 71 to be quickly and easily securely affixed to connector 20 for enabling the electrical conducting wires retained within tubings/conduits 70 and 71 to be easily carried through solid or rigid tube/conduit 73. In this way, the electrical wires retained within solid tubing/conduit 73 are quickly and easily interconnected with and transferred into two separate and independent, smaller diameter, solid or rigid tubes/conduits 70 and 71 for achieving installation ease, convenience, and efficiency.

In the preferred construction of this embodiment of the present invention, as fully depicted in FIGS. 19-28, dual or duplex conduit/cable connector 20 is constructed with a front end 22 incorporating two portals or receiving zones 75 and 76 formed therein, with rear end 23 of connector 20 incorporating enlarged portal or receiving zone 77. In addition, the diameters of portals/receiving zones 75 and 76 are constructed for enabling any desired, smaller diameter solid or rigid tubings/conduits 70 and 71 to be quickly and easily inserted therein.

Although front end 22 of connector 20 may be constructed for cooperating with any desired diameter of solid or rigid tubings/conduits 70 and 71, it has been found that tubings/conduits 70 and 71 preferably comprise a diameter ranging between about 0.5 inches and 0.75 inches. In addition, rear end 23 of connector 20 is preferably constructed for enabling solid or rigid tubing/conduits 73 to be mounted therein which comprise a diameter ranging between about 0.75 inches and 1.0 inches.

In a typical installation, dual/duplex conduit/cable connector 20 is securely mounted to a desired solid or rigid tube/conduit 73 by telescopicly inserting the end of tube/conduit 73 into portal receiving zone 77 for engagement with connector 20. Once tube/conduit 73 is fully inserted into portal receiving zone 77, tube/conduit 73 is securely affixed to connector 20 by rotating locking screw 80, until screw 80 is securely frictionally engaged with the outer surface of tube/conduit 23, thereby preventing its withdrawal from connector 20.

Similarly, solid or rigid tubing/conduit 70 is secured to dual/duplex conduit/cable connector 20 by telescopically advancing the end of tube/conduit 70 into portal/receiving zone 75 of connector 20. Once tube/conduit 70 is fully inserted into portal/receiving zone 75, locking screw 81 of connector 20 is threadedly advanced into contact with tube/conduit 70 for assuring the secure affixation of tube/conduit 70 with connector 20.

The installation is completed by telescopicly advancing solid or rigid tubing/conduit 71 into portal/receiving zone 76 of connector 20 until tubing/conduit 71 is fully inserted therein. Then, locking screw 82 is threadedly advanced into contact with tubing/conduit 71 for assuring its secure affixation to connector 20.

In the preferred construction of this embodiment of the present invention, connector 20 is constructed with portals/receiving zones 75 and 76 comprising separate and dependent passageways for enabling the desired tubings/conduits to be inserted and fully retained therein, with portals/receiving zone 75 and 76 each separately peripherally surrounding and enclosing tubings/conduits 70 and 71. In addition, connector 20 also incorporates rigid, panel 85 extending between and interconnecting portals/receiving zones 75 and 76.

In its preferred construction, rigid panel 85 extends horizontally the entire length of portals/receiving zone 75 and 76, effectively providing a stiffening and reinforcing panel member for each portal/receiving zone. It has been found that the incorporation of rigid panel 85 is highly advantageous for maintaining each portal/receiving zone with its desired diameter and preventing any unwanted buckling or ovalation of the portals/receiving zones during the secure affixation of tubings/conduits 70 and 71 therein.

Figure 23:
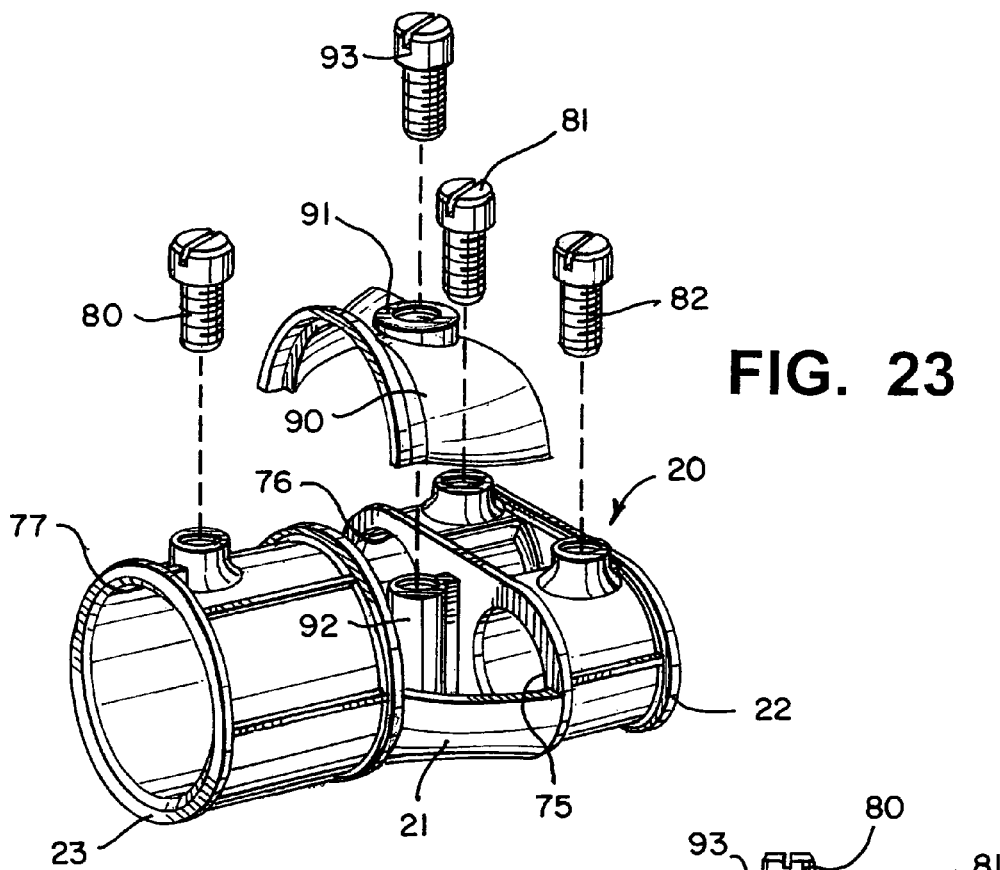
FIG. 23 is an exploded perspective view of the multiple conduit connector of FIG. 20.
Figure 24:
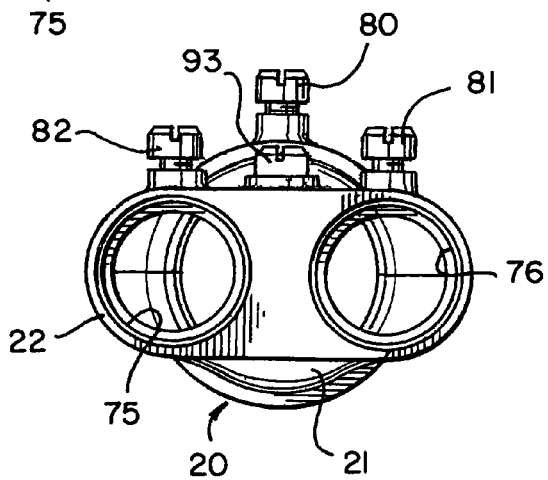
FIG. 24 is a front elevation view of the multiple conduit connector of FIG. 20.
Figure 25:
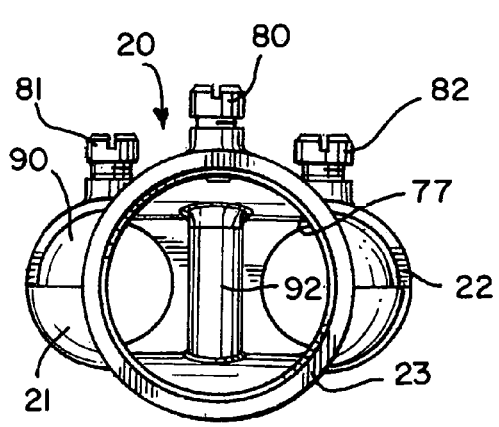
FIG. 25 is a rear elevation view of the multiple conduit connector of FIG. 20.
Figure 26:
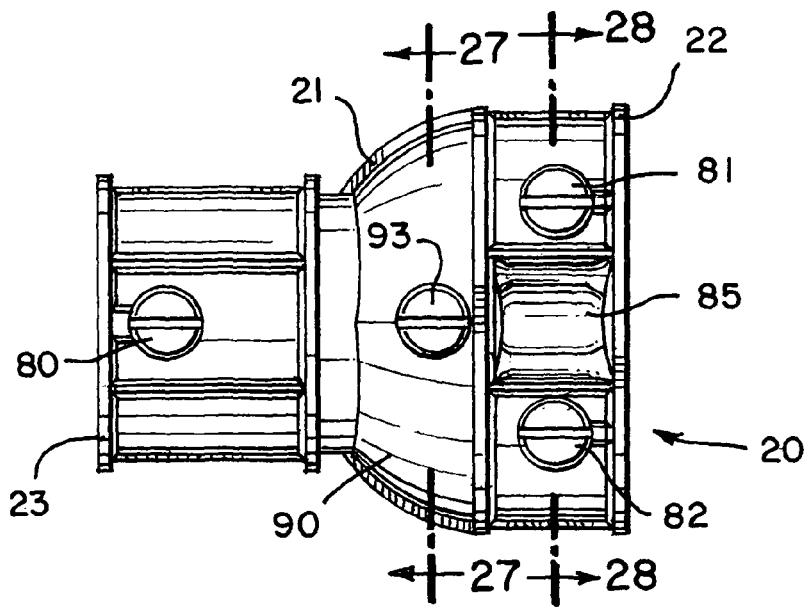
FIG. 26 is a top plan view of the multiple conduit connector of FIG. 20.
Figure 27:
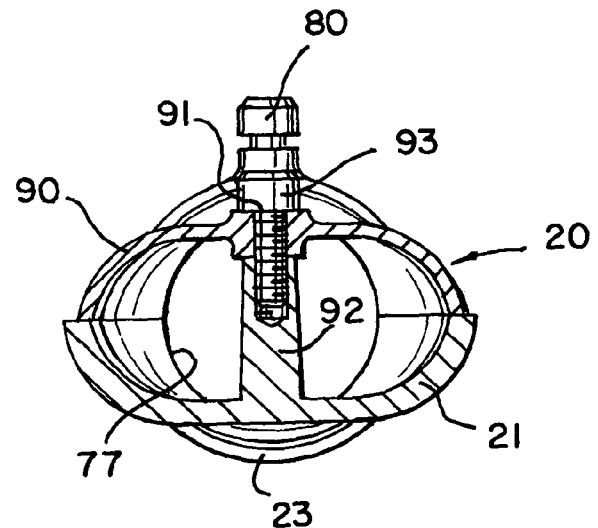
FIG. 27 is a cross-sectional elevation view of the multiple conduit connector of the present invention taken a long line 27-27 of FIG. 26.
Figure 28:
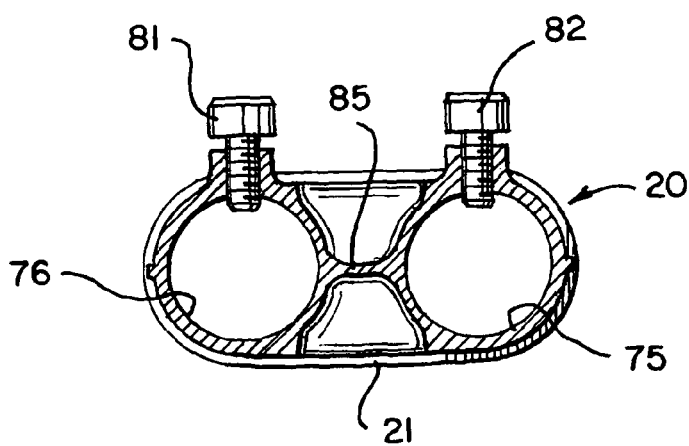
FIG. 28 is a cross-sectional elevation view of the multiple conduit connector of the present invention taken a long line 28-28 of FIG. 26.

Finally, in the preferred construction of this embodiment of the present invention, connector 20 preferably incorporates removable cover plate 90 for enabling the installation and inspection of the electrical wires passing through connector 20. As best seen in FIG. 23, removable cover plate 90 is positioned between front end 22 and portals/receiving zones 75 and 76 which form a part thereof, and rear end 23 and portal/receiving zone 77. As depicted, cover plate 90 preferably comprises the entire upper portion of this mid-section of body 21 of connector 20, but may comprise any desired alternate size and shape.

In addition, in order to enable cover plate 90 to be quickly and easily removed from body 21 of connector 20 as well as quickly replaced when the desired, cover plate 90 incorporates through hole 91 which is positioned for overlying alignment with post member 92 which is mounted in body 21 of connector 20 in the central section thereof. In addition, the terminating end of post member 92 incorporates a threaded zone, which enables set screw 93 to inserted into through hole 91 and threadedly engaged in the threaded zone of post 92, for securely affixing cover plate 90 directly to body 21 of connector 20 when desired.

During the installation of the electrical wires through connector 20, it is often desirable to obtain access to the interior of body 21 of connector 20 for being certain that the wires contained within larger diameter tubing/conduit 73 are properly positioned in the desired smaller diameter tubings/conduits 70 and 71. As a result, during the installation of the electrical wires, cover plate 90 may be removed to enable the installer to both view and assist in placing the electrical wires in the precisely required position. Then, once the electrical wires have been properly positioned, the final assembly of connector 20 is completed and cover plate 90 is returned to its original position, closing and sealing connector 20.

Furthermore, if desired, cover plate 90 is also employed for assisting in the inspection of the position and location of the electrical wires contained therein. As a result, once installation has been completed, anyone is able to access the interior of body 21 of connector 20 for determining the precise location and position of any particular electrical wires. By merely removing cover plate 90 from its secure position, the inspection can be quickly and easily achieved and, once completed, cover 20 is returned to its original position for final installation.

As is evident from the foregoing detailed discussion, each embodiment of dual/duplex conduit/cable connector 20 of the present invention is constructed for enabling flexible metal conduits, armored or metal clad cables, and/or rigid electrical tubes/conduits to be quickly and easily secured to connector 20 with the entire assembly being mounted to any desired solid or rigid tube/conduit. By employing the present invention, this desired mounted interengagement is achieved quickly and easily, in an extremely cost efficient manner. As a result, prior art difficulties and drawbacks are fully overcome and an easily achieved assembly is realized.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what we claim as new and desire to secure by Letters Patent is:

1. An electrical connector constructed for enabling electrical wires contained in a first rigid, metal tube or conduit to be combined with and extended through a second and a third, separate and independent rigid, metal tubes or conduits without interruption or breakage, said connector/coupling comprising:
   A. a unitary, integrally formed body member having a first end and a second end;
   B. the first end of the body member comprising two separate and independent portals or receiving zones for receiving and securely holding the second and the third rigid, metal tubes/conduits in independent, adjacent, side to side relationship; and
   C. the second end of the body member constructed for being quickly and easily securely mounted to the first rigid, metal tube/conduit;
   whereby two separate and independent rigid metal tubes/conduits are quickly and easily securely combined for mounting with a third solid or rigid metal tube or conduit for enabling the electrical wires contained therein to be fed through the rigid metal tubings/conduits in a continuous, uninterrupted manner without being cut, severed, or join to each other or to other electrical wires.

2. The electrical connector defined in claim 1, wherein the two separate and independent portals/receiving zones are further defined as comprising a first and a second, separate and independent passageway constructed for enabling the first and the second rigid, metal tubes/conduits to be separately, telescopically inserted therein for enabling each tube/conduit to be received and retained in a separate and independent zone, in a side to side adjacent relationship while also being electrically independent from each other.

3. The electrical connector defined in claim 2, wherein said connector further comprises a first clamping member cooperatively associated with the first passageway for securely affixing the first rigid, metal tube/conduit in the desired inserted position, and a second clamping member cooperatively associated with the second passageway for securely affixing the second rigid, metal tube/conduit and the desired inserted position.

4. The electrical connector defined in claim 3, the second end of the body member is constructed for enabling the first rigid, metal tube/conduit to be inserted therein for secure retention, with said second end incorporating a third clamping member mounted thereto for securely affixing the first rigid, metal tube/conduit in the desired position.

5. The electrical connector defined in claim 4, wherein each of said clamping members are further defined as comprising threaded screws mounted to the connector for being advanced into engagement with the associated solid or rigid metal tube/conduit whenever desired.

6. The electrical connector defined in claim 3, wherein said connector further comprises a stiffening member formed between the first passageway and the second passageway, said stiffening member being constructed to prevent deformation of said first and second passageways when the first and second rigid metal tubes/conduits are clamped therein.

7. The electrical connector defined in claim 6, wherein said stiffening member is further defined as extending from the outer surface of the first passageway to the outer surface of the second passageway.

8. The electrical connector defined in claim 7, wherein said stiffening member is further defined as comprising a substantially flat plate member extending between the first and second passageways and positioned substantially along the diameter thereof.

9. The electrical connector defined in claim 2, wherein each of said separate and independent portals/receiving zones are further defined as being constructed for peripherally surrounding the rigid, metal tube/conduit inserted therein.

10. The electrical connector defined in claim 1, wherein said connector further comprises a removable cover mounted between the first end and the second end for enabling access to the interior of the connector to be easily obtained.

11. The electrical connector defined in claim 10, wherein said removable cover is further defined as comprising a curved plate constructed for forming a portion of the connector with said curved plate being easily affixed to and removable from the body member.

12. The electrical connector defined in claim 11, wherein said removable cover his cooperatively associated with fastening means insertable through said cover and lockingly engaged with the interior of the body member.

13. The electrical connector defined in claim 12, wherein the body of the connector is further defined as comprising an upstanding post formed therein substantially midway between the front end and the second end, with said post incorporating a threaded zone integrally formed therein.

14. The electrical connector defined in claim 13, wherein said fastening means comprises a screw member insertable through said cover and constructed for engaging the threaded zone of the upstanding post for securely affixing the cover member to the body of the connector.

* * * * *